March 3, 1931. L. W. SERRELL 1,794,870
BROILER GRID
Filed Dec. 6, 1929 2 Sheets-Sheet 1
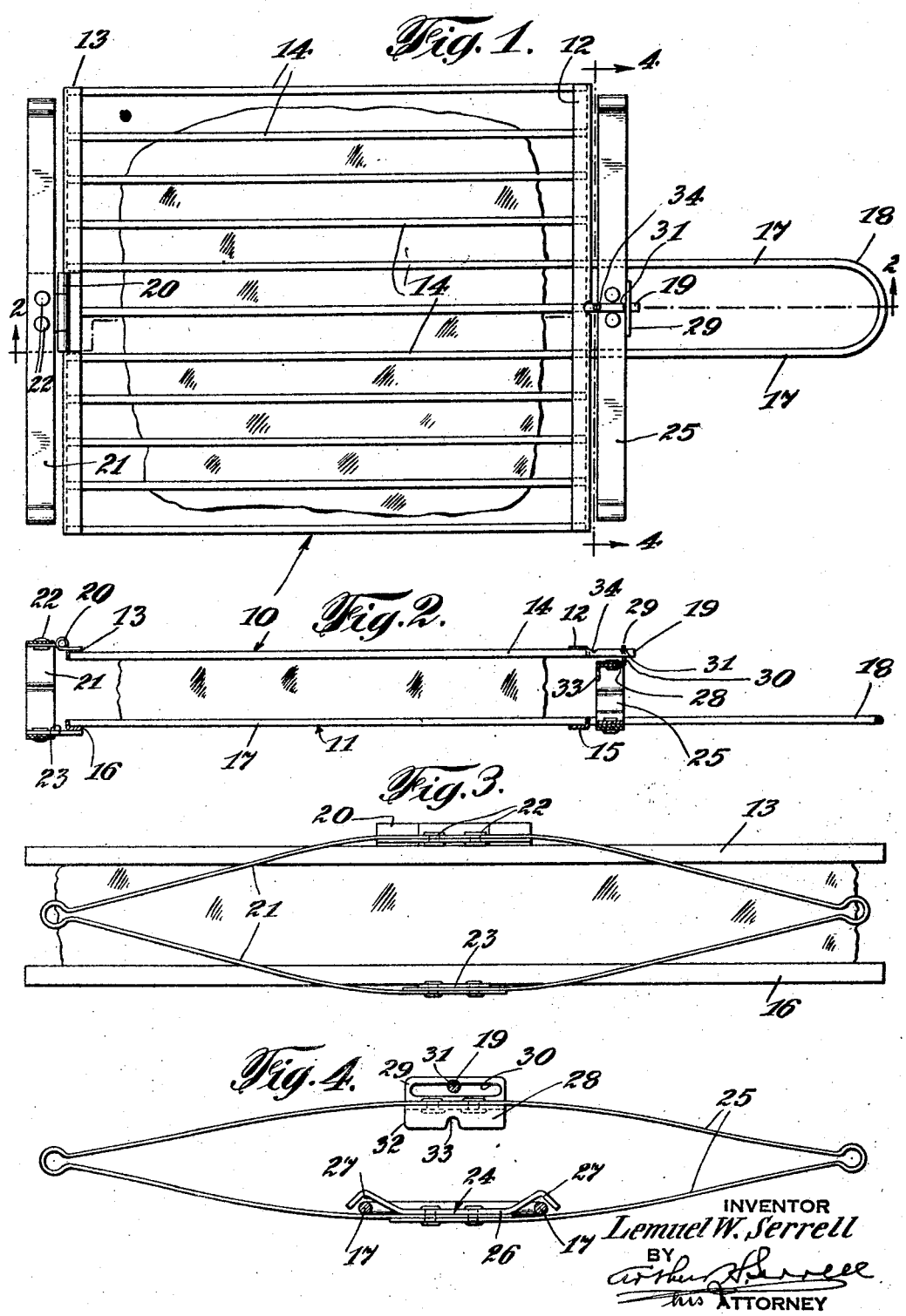

March 3, 1931.    L. W. SERRELL    1,794,870
BROILER GRID
Filed Dec. 6, 1929    2 Sheets-Sheet 2
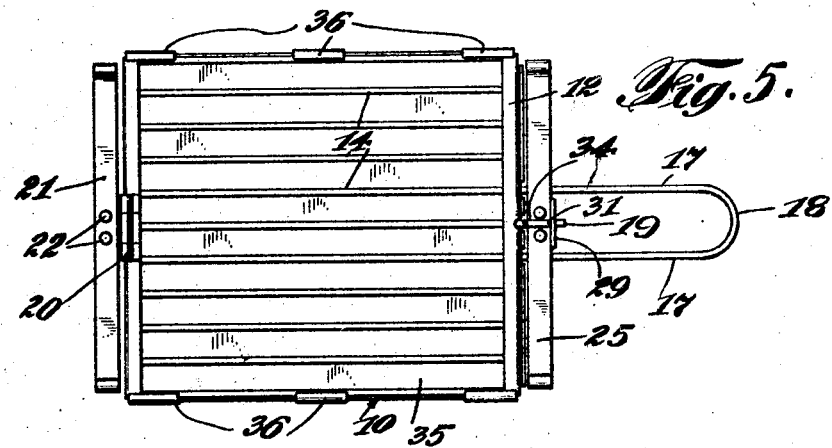
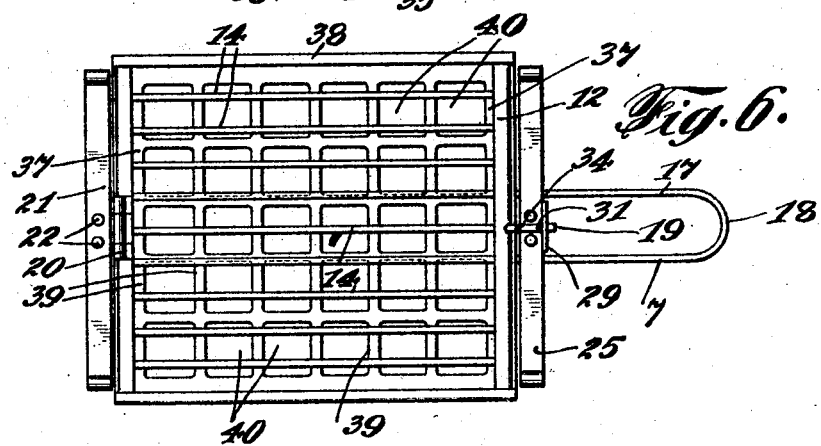
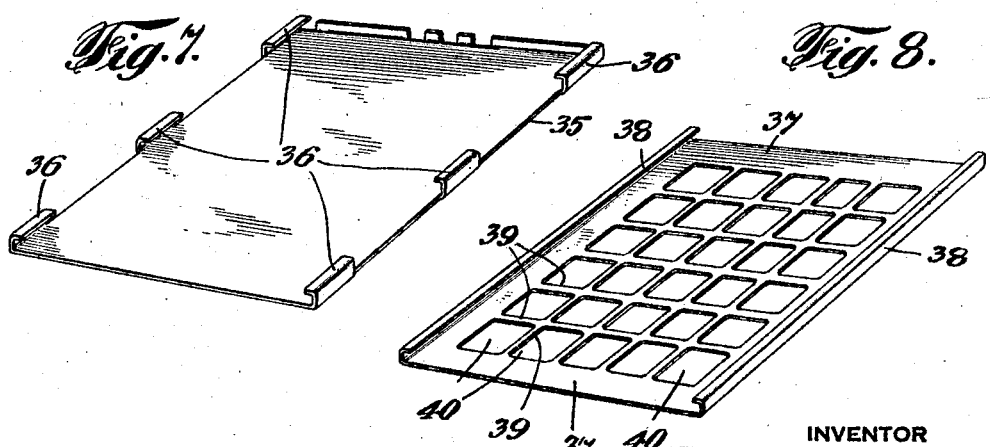
INVENTOR
Lemuel W. Serrell
BY
ATTORNEY Patented Mar. 3, 1931

1,794,870

UNITED STATES PATENT OFFICE

LEMUEL W. SERRELL, OF NEW YORK, N. Y., ASSIGNOR TO SERELCO INC., OF NEW YORK, N. Y., A CORPORATION OF DELAWARE

BROILER GRID

Application filed December 6, 1929. Serial No. 412,053.

My invention relates to an improvement in broiler grids adapted for use in connection with an electric stove and in which a grid is preferably held in a vertical position permitting the application of heat simultaneously to both sides thereof, although it is to be understood that the invention is not necessarily so limited. The type of grid to which this invention generally relates is shown and described in Letters Patent No. 1,712,474, granted May 7th, 1929, in which there is a grid having the parts thereof yieldingly and pivotally connected at corresponding edge portions thereof and adapted to be fixedly connected at oppositely disposed edges thereof. In this construction the parts of the grid are not so adjustable relatively to each other that there is a complete equalization of the tension between them. Consequently to grip and properly retain articles of food the thicker articles must necessarily be placed adjacent the yieldingly connected edge portions of the grid members. In order, however, to effect a substantially even or uniform equalization of the tension applied by the members of the grid to promiscuously place the articles of food between them it is necessary to yieldingly connect both oppositely disposed edge portions of the grid and also preferably to so arrange the connections that one grid member is tiltable or rockable relatively to the other grid member. In so connecting the grid members the articles of food may be placed in substantially any desired manner between them and adequately gripped for the intended purposes.

The main object of my present invention is the provision of a grid so constructed that in the use thereof there is a complete equalization of the tension between the members thereof in order to firmly retain in position articles of food of different thicknesses within practical limits. A further object of my present improvement is to provide a means for broiling articles of food such as bacon and fish in such a manner that they remain flat, that is, will not curl, and may be readily removed from the grid. It is well known that in the ordinary type of grid such articles of food as hereinbefore mentioned adhere to the surface or frame of the grid after broiling and this makes unnecessary work in the removal thereof, oftentimes resulting in considerable damage to the articles of food and inconvenience to the person operating the broiler.

The grid in which I attain these objects is illustrated in the accompanying drawings in which Figure 1 is a plan view illustrating the improved broiler grid, Fig. 2 is a section on line 2—2, Fig. 1, Fig. 3 is an end view showing the rear spring of the grid, Fig. 4 is an enlarged section taken on line 4—4, Fig. 1, Fig. 5 is a plan view of the grid showing an attachment for broiling bacon, Fig. 6 is a plan view of the grid showing an attachment for broiling fish, Fig. 7 is a perspective view of the attachment for broiling bacon, and Fig. 8 is a perspective view of the attachment for broiling fish.

Referring to the drawing, Figs. 1 to 4 inclusive, it will be seen that in carrying out the invention the improved broiler grid or some similar utensil is constructed to include a set of frames 10 and 11. As shown the frame 10 is made to include end bars 12 and 13 connected by suitably spaced rods 14. The frame 11 also includes end bars 15 and 16 connected by centrally spaced rods 17. The pair of centrally spaced rods 17 are adapted to extend through the end bar 15 and are looped as indicated at 18 to form a suitable handle. In the frame 10 one of the rods 14, preferably the central rod, is adapted to extend through the end rod 12, as indicated at 19.

As illustrated (Fig. 2) the end bar 13 is fitted with a hinged bracket member 20 which is also connected to one part of a leaf spring 21, as indicated at 22, by means of rivets, or otherwise. The frame 10 is adapted to be moved or swung relatively to the frame 11 by means of said hinged bracket member 20. The end bar 16 is fitted with a bracket 23 which is connected to the lower part of the leaf spring 21 by means of rivets or otherwise. The leaf spring member is preferably made equal in length to the end bars of the frame and of a material the resiliency of which is not materially affected by heat.

Associated with the handle rods 17, which extend through the end bar 15 and form a loop 18, is a slide 24. This slide is composed of a leaf spring 25 substantially the same in form and shape as the leaf spring 21.

On one side of the spring 25 is a bracket 26 riveted or attached by other means thereto. The opposite ends of the bracket 26 are bent to provide grooves 27 adapted to retain the rods 17 between the surfaces defining the grooves and the adjacent inner surface of the spring member and permitting the slide member 24 to move along the rods 17 inwardly towards the end bar 15 or outwardly towards the loop 18. The opposite side of the spring member 25 also has a bracket 28 suitably connected thereto. The outwardly disposed portion of the bracket 28, indicated at 29, has a slot 30. The edge defining the upper side of the slot is adapted to engage in a notch 31 on the surface of the extending rod 19 (Fig. 2).

The inwardly disposed portion of the bracket, indicated at 32, has a recess 33, the edge defining the inner portion of which is adapted to fit in a notch 34 in the surface of the extending rod 19. Now it will be obvious that the part of the bracket 28 which is used to retain the extending rod 19 is dependent upon the size of the articles of food to be placed between the frame. When the thickness of the articles of food is relatively small the inner surface of the recess 33 is readily adaptable to position in the notch 34, retaining said articles of food firmly between the frames 10 and 11 through the action of the leaf springs 21 and 25. If the articles of food to be placed between the frames are relatively large and vary greatly in thickness the slotted part of the bracket 28 is placed in position in the notch 31. In use the extension rod shown at 19 automatically positions itself in any part of the slot 30 to permit the frames 10 and 11 to be self-adjusting to accommodate articles of various thicknesses which are retained firmly between the frames 10 and 11 by means of the leaf springs 21 and 25.

It is to be observed that when the extension rod 19 is in place either within the slot 30 or the recess 33 the frame member 10 may pivot thereon so as to be rockable or tiltable relatively to the frame member 11 in order to more readily cause the frame members to be automatically shiftable to position to accommodate the articles of food placed and clamped between them. Furthermore, if necessary, a similar pivotal connection might be employed at the opposite end of the frame members.

Referring to Figs. 5 and 7, an attachment or plate 35 having brackets 36 which adapt it to be slidable into position, or to snap into place, on the outer rods 10 or 17 and on the inner surfaces of both frames 10 or 11 is shown. In the operation of the grid for broiling bacon the plates are used in sets. One of these is placed on the inner side of the frame 10 and the other on the inner side of the frame 11, the said plates retaining the bacon firmly between their surfaces.

It will be readily seen that bacon broiled in such a manner will retain its usual flat form and cannot possibly stick to the surfaces of the grid.

Figs. 6 and 8 show the attachment or plate 37 for broiling fish. The plate 37 has brackets 38 adapting it to be slidable into position or to snap on in identically the same manner as the plate 35. Said plate is constructed with cross bars 39 providing openings 40. The cross bars 39 are wider than the rods 14 and 17 and will not cut into or retain the fish on its surface after the broiling is completed. Like the plates 35 the plates 37 are employed in pairs or sets, one plate being applied to each frame of the grid.

It will now be understood that in the use of my improved broiler grid the frame members may be swung apart, turning on the hinged bracket member 20, whereupon articles of food may be placed between the frame members, or upon the frame member 11 and the frame member 10 swung back to position against the articles of food, whereupon the extension rod 19, or the adjacent edge portion of the frame member 10, may be depressed and the spring 25 extended sufficiently to permit the extension rod 13 to lie in the groove 33, or to enter the slot 30. The parts being then released the tension exerted by the spring members through the members of the grid to maintain the articles of food in position is evenly distributed throughout substantially the entire extent of the members of the grid, making it possible to retain articles of widely different thicknesses in position irrespective of the manner in which they may be placed in the grid.

I claim as my invention:

1. In a grid, a set of frames, a spring fixedly connected to a frame member at one edge thereof and pivotally connected to another frame member at the corresponding edge thereof, and a slide member comprising a spring and means thereon for connecting the said frame members to one another at the opposite edges thereof whereby through the action of said springs the frames automatically adjust themselves to retain articles of different thicknesses.

2. In a grid, a set of frames, spaced rods therein, a spring fixedly connected to a frame member at one end thereof and pivotally connected to another frame member at the corresponding end thereof, a handle, a slide member operative thereon, a spring located on said slide member, and means associated with the last aforesaid spring for clamping the opposite ends of the said frames to one another whereby the frame members automatically adjust themselves to retain articles of different thicknesses between their surfaces.

3. In a grid, a set of frames, spaced rods therein, a spring fixedly connected to a frame member at one end thereof and pivotally connected to the other frame member, a handle on one frame member, a slide member operative thereon, a spring located on said slide member, and brackets on the second spring member, the surfaces of which are adapted to engage notches on a rod projecting from the other frame member thereby automatically adjusting the frame members to retain articles of different thicknesses between their surfaces.

4. In a grid, a set of frames, a series of spaced rods therein, a spring fixedly connected to one frame at an edge portion thereof and pivotally connected to another frame at the corresponding edge portion thereof, a handle extending from the oppositely disposed edge portion of one frame, a slide member mounted on the said handle, a spring secured to the slide member a bracket carried by the last aforesaid spring and having a slot therein, and a rod projecting from the edge portion of the front frame member and adapted to enter the slot in the said bracket for connecting the said frame members to permit the automatic positioning thereof one to the other to yieldingly retain articles of different thicknesses between them.

Signed by me this 7th day of November, 1929.

LEMUEL W. SERRELL.